United States Patent [19]
Hibbert et al.

[11] 3,988,485
[45] Oct. 26, 1976

[54] MEAT-LIKE PROTEIN FOOD AND METHOD OF MAKING

[75] Inventors: Harry Russell Hibbert, Dersingham; John Edward Alexander Broadbent, King's Lynn, both of England

[73] Assignee: Mars Limited, Slough, England

[22] Filed: Nov. 18, 1974

[21] Appl. No.: 524,882

Related U.S. Application Data

[63] Continuation-in-part of Ser. No. 470,924, May 17, 1974, abandoned.

[52] U.S. Cl. .............................. 426/104; 426/274; 426/517; 426/574; 426/802
[51] Int. Cl.² .................. A23L 1/20; A23J 3/00
[58] Field of Search .......... 426/104, 274, 137, 305, 426/388, 517, 519, 802, 212, 574

[56] References Cited
UNITED STATES PATENTS

| | | |
|---|---|---|
| 2,682,466 | 6/1954 | Boyer .................................. 426/515 |
| 2,785,069 | 3/1957 | Dudman ............................ 426/802 |
| 3,320,070 | 5/1967 | Hartman ............................ 426/274 |
| 3,498,793 | 3/1970 | Page et al. .......................... 426/802 |
| 3,772,035 | 11/1973 | Carp et al. .......................... 426/274 |
| 3,794,731 | 2/1974 | Dannert .............................. 426/802 |

*Primary Examiner*—Curtis P. Ribando
*Attorney, Agent, or Firm*—Davis, Hoxie, Faithfull & Hapgood

[57] ABSTRACT

Meat-like foods having a perceptible fiber bundle structure resembling that of natural muscle meat are prepared by mechanically interlocking edible protein fibers, such as spun vegetable protein fibers, in groups, which are subsequently assembled into a mass and set to a coherent body with an edible binder, preferably a heat-coagulable protein. The fibers in the bundles may be entwined or enravelled by the turbulence of a fluid jet, such as air or water, or by being passed between rotating parallel rollers that are reciprocated relative to one another in the direction of their axes.

8 Claims, 5 Drawing Figures

MEAT-LIKE PROTEIN FOOD AND METHOD OF MAKING

This application is a continuation-in-part of United States patent application Ser. No. 470,924, filed May 17, 1974, now abandoned.

BACKGROUND OF THE INVENTION

It is already known, for example from U.S. Pat. No. 2,682,466, that a simulated meat product with some of the firmness and bite characteristics of natural cooked meat can be obtained by impregnating a tow of neutralised spun protein fibres with a heat coagulable binding agent followed by heat treatment.

It is further known for example from the same United States patent, to pass thick bundles of impregnated fibres through a molten fat bath just before combination into the final product, so as to obtain an improvement in the flavour and texture of the simulated meat product. This action results in the uptake of a considerable quantity of fat and, particularly where the fibre bundle diameter is of the order of 1–2 mm, the fat uptake approaches the weight of the fibre bundles themselves with the result that an unpleasant, plastic-textured, fatty-tasting product is obtained on baking. On canning and sterilising, this high fat content separates from the meat chunks and forms an unacceptably thick fat layer at the head-space end of the can.

United Kingdom Pat. No. 1,304,804 describes products more closely simulating the texture and structure of cooked natural meat which are prepared by heat setting the surface of bundles of impregnated oriented protein fibres and then subjecting a plurality of such bundles simultaneously to heat and compressive forces.

SUMMARY OF THE INVENTION

It is an object of the present invention to provide a method of preparing an artificial meat-like protein food, and in particular the preparation from spun protein of a product possessing a similar appearance and fibrous texture to that of muscle meat. It is preferred, though not essential that the flavour and colour of the product should also closely resemble those of such meat, so that the product is palatable to human beings and has a high degree of acceptance by pet animals.

The present invention provides a method of preparing a meat-like protein food comprising bundles of edible proteinaceous fibres bonded and set together, wherein the fibres in each individual bundle are mechanically manipulated to enravel or entwine together the individual fibres in each bundle, such that the fibres in the individual bundles are substantially interlocked and the bundles remain perceptible when combined and set in the final product. The meat-like product so produced has been found to retain an appearance close to that found in the bundle structure of close-grained muscle meat. The process has the advantage that it makes unnecessary any setting treatment of the impregnated individual bundles, while retaining a good bundle appearance in the finished product.

The invention thus provides, in another aspect thereof, a meat-like protein food comprising a plurality of bundles of edible proteinaceous fibres bonded together by an edible binder, the fibres in the individual bundles being enravelled or entwined such that the discrete structure of individual bundles is perceptible in the food.

DESCRIPTION OF THE PREFERRED EMBODIMENTS

In accordance with a typical procedure, bundles of spun protein fibres are taken and mechanically agitated in such a way that a proportion of the fibres become ravelled together, thereby causing the bundle of fibres to interlock and become resistant to separation of the individual fibres, but still leaving the bulk of the fibres substantially orientated in a generally parallel manner. The mechanical process may also actually break a small proportion of the fibres whereupon the loose ends so formed may protrude from the bundle and help to form connections between impregnated bundles during the final stage when numbers of the bundles are heated together to form a meat-like product.

The number of fibres in a bundle is selected to give a bundle thickness similar to that of discernible bundles in the meat to be simulated.

The ravelling process may be carried out in several ways. The bundles of fibres may be mechanically agitated by turbulence created in a flow of fluid, for example a jet of air or water. The bundles may be rubbed with a rolling action between two close surfaces. The fibres in the bundle may be twisted together or they may be plaited or braided.

Figure 1:
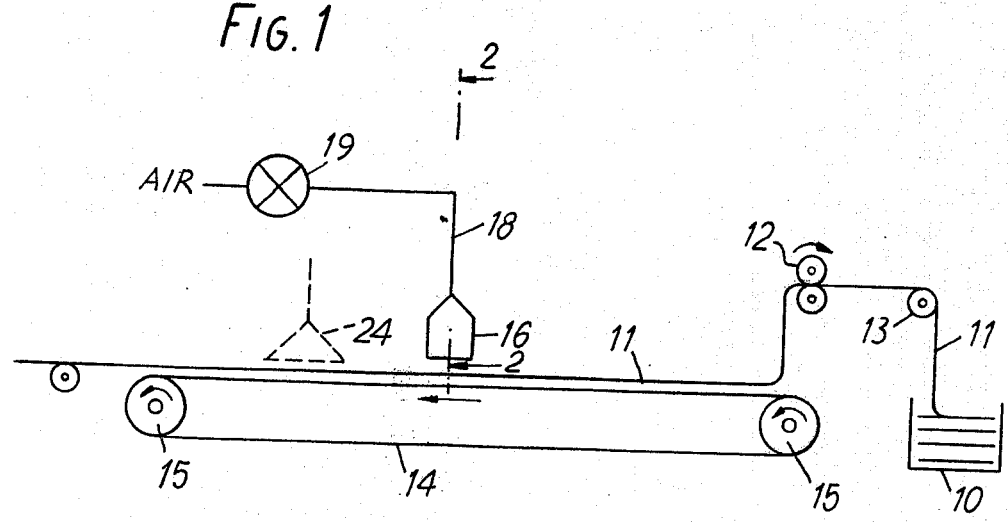
FIG. 1 is a diagrammatic elevation of apparatus for enravelling fibres in a fibre bundle by air turbulence.
Figure 3:
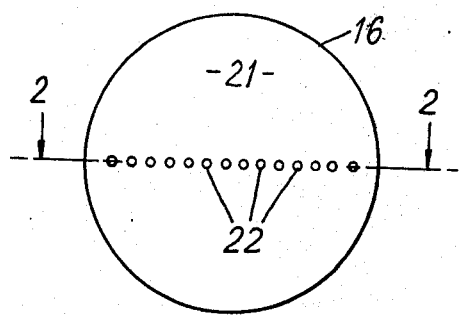
FIG. 3 is a bottom end view of the air jet nozzle of FIG. 2, looking upwardly.
Figure 2:
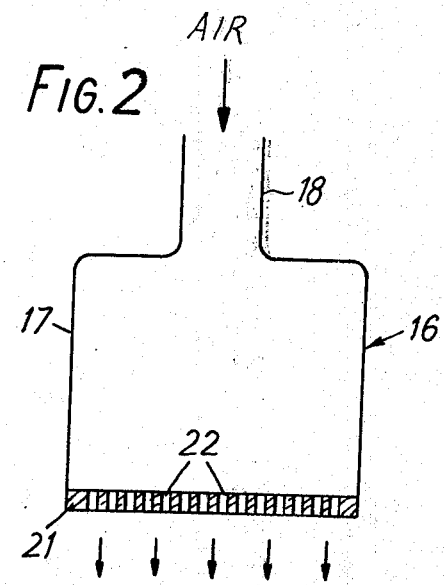
FIG. 2 is a transverse vertical section of the air jet nozzle in the apparatus of FIG. 1, taken along the line 2—2 of FIG. 1.

In FIGS. 1 to 3 is shown one example of apparatus for carrying out the interlocking or ravelling operation which is the primary feature of this invention.

From a container 10 affording a supply of spun protein filament tow, a continuous tow of filaments 11 is drawn out by the driven roller nip 12. The tow is drawn from the container over an idle roll 13 and is deposited on a belt conveyor 14 which passes over end rollers 15 and is driven in the direction of the arrow from a motor (not shown).

Above the conveyor is arranged an air jet nozzle 16, best seen in FIGS. 2 and 3. The nozzle comprises a hollow body 17 connected by means of a pipe 18 to an air pump 19 which is driven by a motor (also not shown). The end of the nozzle body is closed by a plate 21 in which is formed a row of apertures 22 for the passage of compressed air. Typical dimensions for these apertures are 1/16 inch diameter at ⅛ inch centres spacing.

The nozzle 16 is so disposed that the air jets are directed downwardly on the tow of fibres 11 passing along the conveyor with the apertures 22 aligned transversely of the tow. The blast splits the fibres into bundles and entwines the fibres together in the individual bundles. The fibres on the belt are not in tension and are accordingly free to move under the influence of the blast, and show no tendency to reorient themselves once the region of the air jets has been passed. Thus the division into bundles is not lost but remains perceptible throughout subsequent processing and into the final product.

Figure 4:
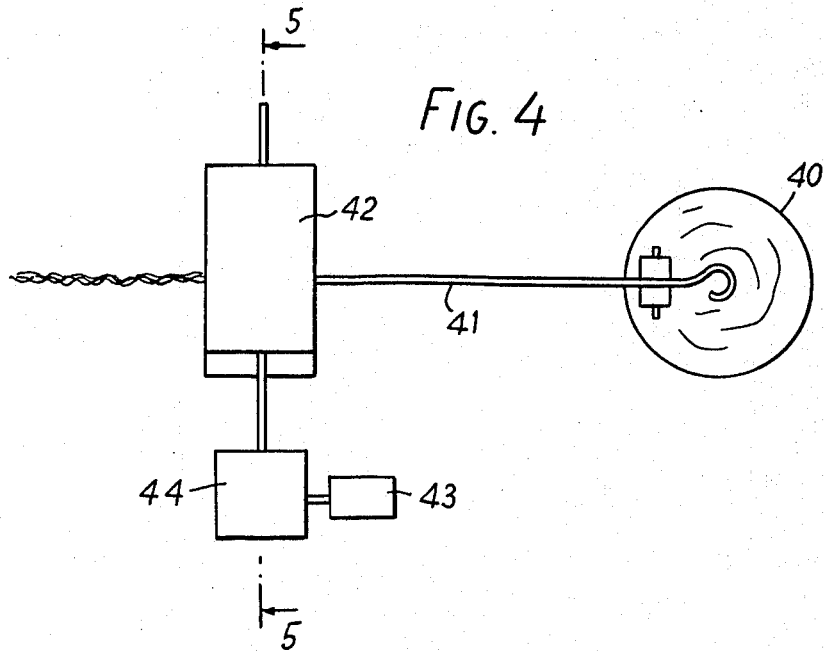
FIG. 4 is a diagrammatic plan view of apparatus for enravelling fibres between transversely reciprocating rollers.
Figure 5:
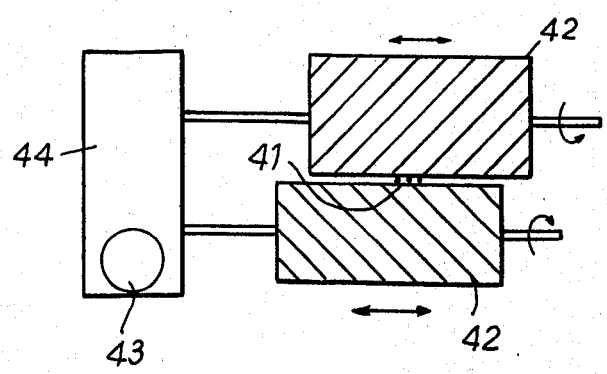
FIG. 5 is a vertical section along the line 5—5 in FIG. 4.

An alternative apparatus is shown in FIGS. 4 and 5. A container 40 supplies a bundle of protein fibres or filaments 41 which is drawn through a pair of rollers 42. The rollers are driven by a motor 43 through a gear box 44 which supplies rotational and translational movement such that the rollers are rotated to draw the fibres between them but at the same time are given axial reciprocating movement contrary to one another. (At the instant represented in FIG. 5, the rollers are moving in the directions of the arrows.) This movement rolls the fibres in the bundle together and causes them to become entwined or enravelled in a manner that ensures the preservation of perceptible bundle structure in subsequent processing and the final product.

It will be apparent that, depending upon the width or duplication of rollers, conveyors, nozzles and other structures, the different forms of apparatus described above can be adapted to process a number of tows of fibre bundles simultaneously side by side.

A wide range of edible proteinaceous fibres can be employed, although clearly they should be selected to withstand the particular mechanical manipulation employed in interlocking them in bundles. They will, however, usually be in the form of continuous filaments and may be spun, regenerated protein fibres for example of soya or field bean protein. The fibres may contain additional material such as colouring, flavouring or texture modifiers. They may be prepared by conventional methods, as by dissolving the protein in alkali and extruding the solution into an acid bath.

An edible binder is applied to the fibres or to the fibre bundles. This binder may be any edible material which after assembly of the enravelled bundles can be caused to set to bind the bundles into a chewable coherent mass. The properties of the binder have an important effect on the properties of the product. Thus, although a coherent product can be made using a polysaccharide or cereal binder, this type of binder tends to confer a rather brittle texture and a preferred meat-like chewy texture is best achieved by the use of a heat-coagulable protein binder. Various suitable binders have been disclosed in the extensive literature on the preparation of meat-like foods by binding together protein fibres, but the present preferred binders are coagulable proteins such as gluten or egg albumen.

The binder may be contained in a liquid composition or emulsion with which the fibres or fibre bundles are impregnated. The emulsion, which will usually be aqueous, may also contain nutritional additives, such as vitamin or mineral sources, fats or oils, colouring matters and flavouring, among which may be included comminuted meaty materials to contribute a meaty flavour.

The ratio of protein fibres to binder in the final product and the ratio of fibres to binder emulsion used in the preparation of the product are not critical and depend on the nature of the binder and on the physical properties required of the product. Where the binder is a heat-coagulable protein such as gluten or egg albumen the fibres are preferably impregnated with the binder emulsion in the range of 15 to 300% emulsion be weight of the fibre, with the binder concentration in the emulsion being 10 to 50% by weight.

The fibres may be impregnated with an emulsion containing a coagulable binder before or during the mechanical agitation, for example by spraying with a spray mounted over the conveyor belt of the apparatus of FIG. 1 as indicated in broken lines at 24 in that Figure, or afterwards as in the examples below.

Example 1

Spun protein fibres are taken which have been prepared by dissolving vegetable protein such as field bean or soya protein in alkali and spinning into an acidic bath, according to conventional techniques. The fibres as taken contain about 12% protein.

A continuous bundle or tow of the fibres, each bundle consisting of about 200 fibres, is passed with minimal tension through a jet of air so directed that the fibres are disturbed from their close proximity to each other and agitated in such a way that they become enravelled or intermingled one with another. The apparatus of FIG. 1 was used for this purpose. The fibres are again drawn into a close bundle and retain their discrete bundle structure throughout subsequent processing. The fibre bundles are then impregnated with an emulsion containing a heat-coagulable binder, for example egg albumen or gluten, and optionally a flavouring agent.

The following is one example of a suitable formulation for the binder emulsion and may be applied to fibres at a level of about 100% by weight.

| Ingredient | Percentage |
| --- | --- |
| Dried vital wheat gluten | 18.0 |
| Creamed liver | 18.0 |
| Yeast hydrolysate | 3.0 |
| Salt | 0.5 |
| Monosodium glutamate | 0.3 |
| Flavouring | 7.0 |
| Homogenised whole blood (with 5 % of a 2 % sodium nitrite solution) | 14.0 |
| Arachis oil | 10.0 |
| Water | 29.2 |

The gluten in this formulation serves principally as the binder, the liver to add flavour and some binding action. The blood serves as a colouring matter and flavouring and the oil modifies the flavour and texture of the product.

The impregnated bundles are then laid in a generally parallel manner in a tray. There is no necessity for heating the bundles or any other surface treatment of them before they are placed in the tray. Light pressure is applied to the bundles in the tray in order to obtain a compact uniform structure and to assist subsequent cohesion of the mass. The product is then baked (without continuing pressure) in an oven at 380° F. for 25 minutes.

Example 2

A continuous bundle of protein fibres is passed through a water bath in an area of which there is some turbulence caused by a jet of water positioned so as to impinge upon the fibre bundle as it passes. The effect is that the fibres are disturbed from their close proximity to each other and agitated in such a way that they become enravelled or intermingled one with another. The fibres are again drawn into a single bundle and retain the discrete bundle structure through subsequent processing. This subsequent treatment is then as described in Example 1. In this Example, it is possible for the jet of liquid causing the mechanical agitation to be the coagulable emulsion or some other component (other than water) which is a constituent of the finished product.

Example 3

A continuous bundle of protein fibres is passed through a set of smooth or slightly roughened rollers which both rotate and move transversely with a gentle reciprocating action along the axis of rotation of the rollers, as shown in FIG. 4. Thus the rollers draw the fibre through the rollers by turning on their axis and cause an intermingling of the fibres one with another by their side-to-side movement. When the bundle emerges from the rollers its fibres are sufficiently interlocked for it to withstand further treatment and retain its discrete bundle structure.

In all these Examples, the process may be adapted to use cut lengths of fibre bundles rather than a continuous bundle.

It will be apparent that various changes can be made in the mechanical manipulation techniques described in these Examples. Furthermore, those skilled in the art will recognize that the composition of the binder and the conditions of heat treatment can be varied, with expected results. For example, if egg albumen is used as the effective binding substance the resulting product will be of lower elasticity than that obtained with gluten.

What we claim is:

1. A method of making a meat-like protein food comprising:
    forming bundles of continuous spun edible proteinaceous fibres, each bundle containing a multiplicity of said fibres;
    manipulating said fibres to enravel or intertwine them and thereby interlock said fibres in said bundles while leaving the bulk of the fibres substantially oriented in a gnerally parallel manner, said manipulation comprising agitating said fibres in said groups by turbulence created in a flow of fluid;
    impregnating the fibre bundles with an edible binder;
    assembling a plurality of said fibre bundles in side by side generally parallel arrangement;
    and causing said binder to set and bond together said bundles into a chewable coherent mass in which said bundles retain their integrity and remain perceptible.

2. A method as claimed in claim 1 wherein said edible binder is a liquid composition comprising a heat-coagulable protein and said binder is set by heating said mass of fibre bundles.

3. A method as claimed in claim 1 wherein said binder contains from 10 to 50% by weight heat-coagulable protein and said fibres are impregnated with said binder to the extent of 15 to 300% by weight of said fibres.

4. A meat-like food made by the method of claim 1.

5. A method of making a meat-like protein food comprising:
    forming bundles of continuous spun edible proteinaceous fibres, each bundle containing a multiplicity of said fibres;
    manipulating said fibres to enravel or intertwine them and thereby interlock said fibres in said bundles while leaving the bulk of the fibres substantially oriented in a generally parallel manner, said manipulation step comprising passing groups of said fibres between closely spaced rotating parallel rollers having a relative reciprocating movement in the direction of their axes;
    impregnating the fibre bundles with an edible binder;
    assembling a plurality of said fibre bundles in side by side generally parallel arrangement;
    and causing said binder to set and bond together said bundles into a chewable coherent mass in which said bundles retain their integrity and remain perceptible.

6. A method as claimed in claim 5 wherein said edible binder is a liquid composition comprising a heat-coagulable protein and said binder is set by heating said mass of fibre bundles.

7. A method as claimed in claim 5 wherein said binder contains from 10 to 50% by weight heat-coagulable protein and said fibres are impregnated with said binder to the extent of 15 to 300% by weight of said fibres.

8. A meat-like food made by the method of claim 5.

* * * * *